Patented Aug. 19, 1952

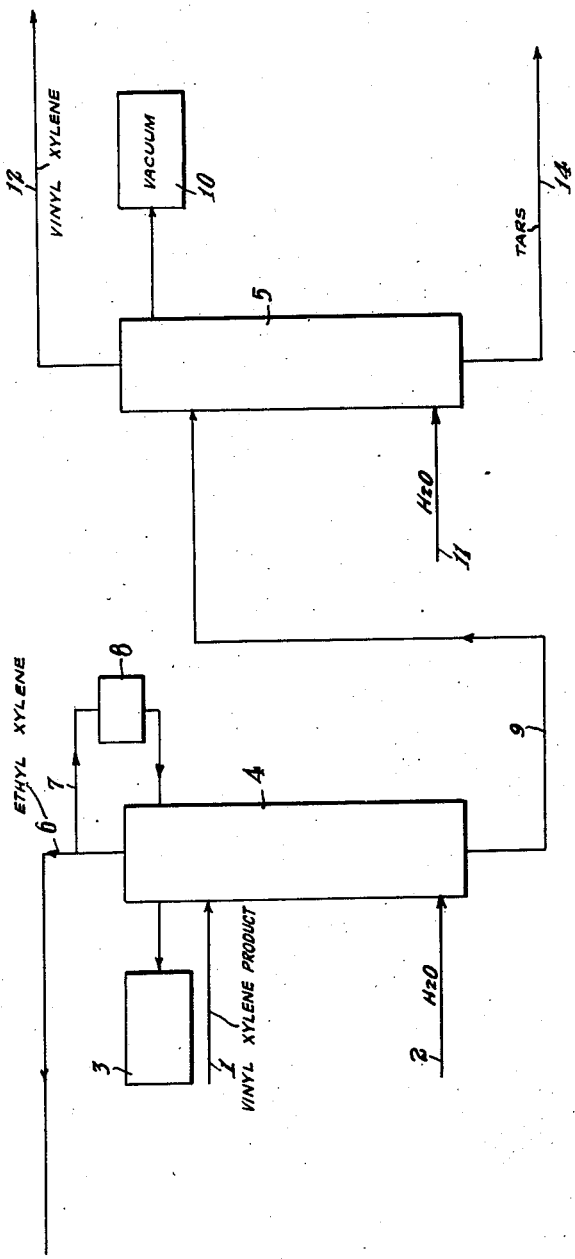

2,607,720

UNITED STATES PATENT OFFICE 2,607,720

PROCESS OF SEPARATING VINYL XYLENES FROM ETHYL XYLENES AND OTHER PRODUCTS

William E. Elwell, Berkeley, and Herman L. Childress, Jr., Richmond, Calif., assignors to California Research Corporation, San Francisco, Calif., a corporation of Delaware Application July 1, 1948, Serial No. 36,357

1 Claim. (Cl. 202—46)

This invention relates to a process for the distillation purification of vinyl xylenes and refers particularly to a process for purifying vinyl xylenes from other products, which vinyl xylenes tend to polymerize even in the presence of polymerization inhibitors, at the temperatures obtained in commercial distillation equipment under ordinary, economical distillation pressures such as, for example, 20–50 mm. Hg. absolute.

The separation of ethyl benzene from the vinyl benzene or styrene is commonly effected commercially by distillation through the addition of sulphur to the distillation column to act as an inhibitor to prevent polymerization of the vinyl benzene or styrene during the distillation process. In such a process, the temperature that is realized in the distillation pot or reboiler for a given pressure at the vacuum pumps is dependent upon the pressure drop in the system. Commonly, in the separation of ethyl benzene and styrene about a 70 plate column is required to give the desired degree of separation. If a pressure of 20 mm. Hg. absolute is obtained at the vacuum pumps and a pressure drop of 10 mm. occurs in the condenser, and 2 mm. per plate in the column, the pressure in the pot or reboiler will be about 170 mm. Hg. For styrene this corresponds to a boiling temperature of about 85° to 90° C., which temperature has been found sufficiently low to inhibit polymerization, provided sulphur is utilized as a polymerization inhibitor.

When attempts are made to apply such a process to the separation of vinyl xylenes from ethyl xylenes it is not found possible to maintain the pot or reboiler temperature sufficiently low as to prevent the polymerization of the vinyl xylenes, unless pressures are employed at the pump which are in the nature of extraordinary low vacuums, which are not achievable economically by present known commercial equipment. It has been found, for example, that when a reaction product which analyzed about 20 to 30% vinyl xylene, the remainder being substantially entirely ethyl xylene, was subjected to distillation in a column with pump pressures as low as about 20 mm. Hg., that as much as 50% of the vinyl xylene was polymerized, even though the column was maintained saturated with sulphur to inhibit polymerization.

We have discovered that it is possible to effect a purification of vinyl xylene using pump pressures obtainable in commercial practice such as 20 to 50 mm. Hg. absolute, provided steam is introduced into the pot or reboiler of the apparatus for the purpose of inhibiting polymerization and facilitating vaporization of the constituents. If such a process is to be effected, it must be carried out in conjunction with the saturation of the column with sulphur to assist in inhibiting polymerization. In other words, we have found that the use of steam during vacuum distillation and the presence of sulphur as an inhibitor is effective in permitting distillation separation of vinyl xylene products, which otherwise undergo very excessive polymerization. Each of the three expedients mentioned, i. e., vacuum distillation, steam, and the use of sulphur as an inhibitor, appears necessary in order that distillation separation be effected without polymerization. Attempts made to effect separation by vacuum distillation alone, or using sulphur and vacuum, or other inhibitors and vacuum, result in excessive polymerization. Similarly, attempts to effect distillation through the use of steam and vacuum either without any inhibitor for polymerization or through the use of other inhibitors of polymerization such as hydroquinone, in place of sulphur, are ineffective. By the addition of steam, vacuum and sulphur to the column, it is possible to effect distillation at temperatures as low as about 75° C. to 89° C., and obtain 90%, or better, yield of vinyl xylene without polymerization.

The process of the present invention will be fully understood from the following description of a preferred example of the process as illustrated in the accompanying drawings.

In the drawings, the figure represents a diagrammatic view of an apparatus in which the process may be conducted, in which drawing, however, for the sake of clarity and simplicity, there have been omitted certain details such as pumps, valves, measuring means, heat exchangers, coolers, refluxing apparatus, flow meters, and like appurtenances, as will be readily supplied by one skilled in the art.

In the process as illustrated in the drawings, the vinyl xylene product which contains generally, in addition to vinyl xylene, ethyl xylene and higher boiling point products such as tar (and it may also contain methyl indenes) is introduced through a line 1 into the distillation column 4. Simultaneously, water (to be converted into steam) or steam is introduced through line 2. The column 4 is generally required to contain about 70 to 90 plates, and in the column the temperature in the distillation pot or reboiler is maintained between 75° and 90° C. Vacuum is applied by means of a vacuum pump 3 located beyond the condenser (not shown), in accordance with the usual practice, and operates to produce a pressure at this point of about 20 to 50 mm. Hg. absolute. As a result of the pressure drops throughout the system and through the plates in the column, there will be maintained a pressure of about 300 mm. Hg. at the pot or reboiler. A ratio of steam entering line 2 to hydrocarbons entering line 1 is maintained at about 2:1 to 5:1 by weight.

In the column 4 the ethyl xylene is removed as an overhead through line 6, but a portion thereof is recycled through line 7 to a sulphur saturator 8, so as to re-enter the column 4 to maintain the column saturated with sulphur. At the bottom of the column, through line 9, there is removed the vinyl xylene, tar and methyl indene present, and this material is introduced into the distillation column 5. The column 5 is similar in construction to the column 4 except that generally a lesser number of plates are necessary to effect the vapor separation required, such as about 25 plates in the column. In this column again a temperature of around 75° to 90° C. is employed in the pot or reboiler. There is provided a vacuum pump 10 diagrammatically illustrated, but connected as usual beyond the condenser (not shown) and operated to maintain the same degrees of vacuum as is maintained in connection with the vacuum pump 3. Pressure on the pot or reboiler of the column 5 should not be higher than 300 mm. Hg. and may (in view of the lesser number of plates) if desired, be maintained somewhat lower. The steam is introduced through the line 11 in a ratio of steam to hydrocarbons of about 2.5:1 by weight to assist in vaporization and inhibiting polymerization. In column 5 sulphur saturation is maintained by carry-over of sulphur from column 4 with the entering material through line 9. From the top of column 5 the vinyl xylene is removed through a line 12 while the tars are separated through line 14.

As an example of the operation of the process, a product containing about 20 to 30% vinyl xylene and about 2 to 4½% methyl indene, the remainder being mostly the 2,5-dimethyl 1-ethyl benzene accompanied by some tar, including polyethyl products, was supplied to the distillation column 4. This process was a batch operation rather than a continuous process, and water in a ratio of about 4 parts by weight to one part of hydrocarbons was supplied to the pot and distillation separated at a pot temperature of about 75° C., which increased to 89° C. during the run. In the separation of the vinyl xylene and tar, the recovery of about 95% of the vinyl xylene was effected.

In the vinyl xylene product obtained, only the first portion of the product was free of methyl indene, as most of the methyl indene is vaporized with the vinyl xylene.

Where the feed material is free of methyl indene, a pure vinyl xylene product may be obtained. Thus, for example, a reaction product which consists of about 20 to 30% of vinyl xylene (substantially 85 to 95% of which is 3,5-dimethyl 1-vinyl benzene, the remainder being mainly the corresponding ethyl benzene with some tar) may be distilled to recover about 90% of the vinyl xylene as a pure product by distilling a mixture consisting of 20 to 30% of vinyl xylene, 85% or more of which is in the form of the 3,5-dimethyl 1-vinyl benzene, the remainder being mainly the corresponding ethyl xylene and tar. About 90% or better of the vinyl xylene material is separable as a tar product. By means of the process of the present invention, it is thus possible to separate vinyl xylenes from compounds containing the same with the substantial elimination of isomerization of the vinyl compounds during the process, whereas before the introduction of steam, even though high vacuum was employed and sulphur inhibitor used, 50% or more of the product was polymerized.

While the particular form of the process herein described is well adapted to carry out the objects of the invention, various modifications may be made, and this invention is of the scope set forth in the appended claim.

We claim:

A process for separating a mixture of ethyl xylene, vinyl xylene, and higher boiling products which comprises distilling the mixture with steam in a first distillation zone in the presence of elemental sulfur to inhibit the polymerization of the vinyl xylene, under a reduced pressure of 20–50 mm. of mercury at the overhead outlet of the distillation zone, and at a pot temperature below about 90° C. to separate ethyl xylene as the overhead fraction, distilling the bottoms from the first distillation zone comprising vinyl xylene, higher boiling products and residual sulfur in a second distillation zone under a reduced pressure of 20 to 50 mm. of mercury at the overhead outlet of the second distillation zone and at a temperature below about 90° C. and introducing about 2 to 5 parts by weight of steam per part of hydrocarbon into the distilland during the distillation to separate an overhead fraction consisting essentially of vinyl xylene.

WILLIAM E. ELWELL.
HERMAN L. CHILDRESS, Jr.

REFERENCES CITED

The following references are of record in the file of this patent:

UNITED STATES PATENTS

| Number | Name | Date |
|---|---|---|
| 2,166,125 | Britton et al. | July 18, 1939 |
| 2,240,764 | Dreisbach et al. | May 6, 1941 |
| 2,308,229 | Natta | Jan. 12, 1943 |

FOREIGN PATENTS

| Number | Country | Date |
|---|---|---|
| 578,965 | Great Britain | Oct. 9, 1942 |